Dec. 15, 1959 D. E. KNOEBEL 2,917,659
TELEVISION RECEIVER APPARATUS
Filed June 13, 1958
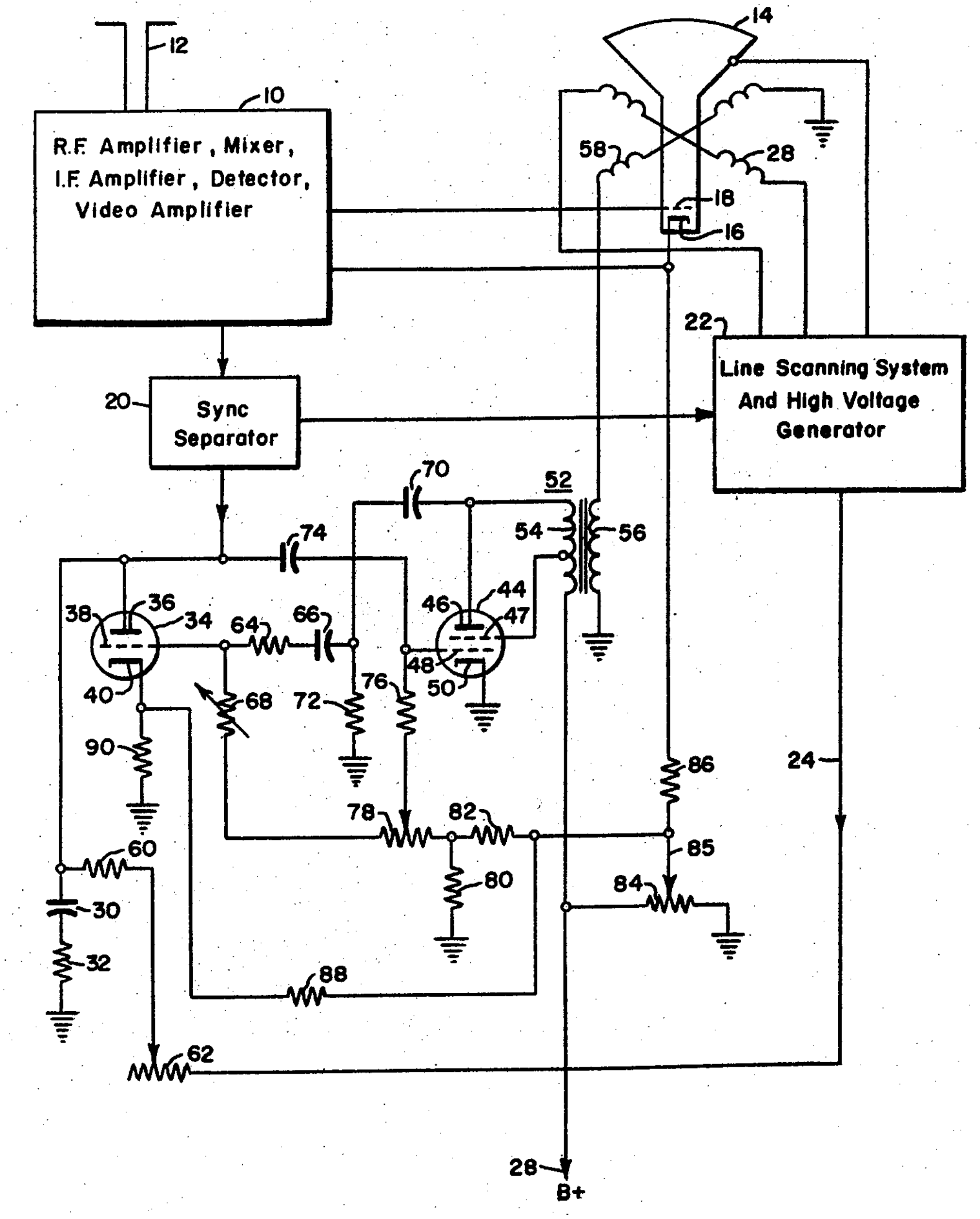
WITNESSES:
Bernard R. Giegucz
James F. Young
INVENTOR
Donald E. Knoebel
BY Benjamin [illegible]
ATTORNEY Patented Dec. 15, 1959

2,917,659

TELEVISION RECEIVER APPARATUS

Donald E. Knoebel, Edison Township, Middlesex County, N.J., assignor to Westinghouse Electric Corporation, East Pittsburgh, Pa., a corporation of Pennsylvania Application June 13, 1958, Serial No. 741,844

4 Claims. (Cl. 315—22)

The present invention relates generally to a beam deflection system for television receivers and particularly to a field scanning system for inexpensive television receivers that more efficiently utilizes the power availabale from the receiver power supply.

In conventional television reecivers it is common practice to provide a D.C. power supply having output voltages at two or more substantially different levels of potential. Different potentials have been required because the scanning circuits and the video amplifier circuits have conventionally required higher operating potentials than the other circuits. In addition, conventional television receivers commonly include a line scanning system having a "B" boost circuit which provides a D.C. potential source of substantially greater voltage than the conventional B+ supply. Such "B" boost type voltage sources are well known to those skilled in the art and need not be described in detail herein. Briefly, such boost type voltage sources usually employ an efficiency diode connected in series with a "B" boost condenser with the series combination being connected across a portion of the line scanning autotransformer effectively in shunt with the line scanning yoke. Normally, the efficiency or damping diode is arranged to conduct during the first portion of the line scanning trace, and the "B" boost condenser is charged in the correct direction to add to the conventional B+ supply.

The provision of a plurality of different B+ potential levels in addition to the so-called boost voltage places a heavy demand on the power supply circuits and has heretofore necessitated the use of large capacity transformers or a plurality of rectifier devices connected in voltage multiplier arrangements. Heretofore, the power supply cost of television receivers has averaged between 5% and 10% of the total cost of the entire receiver. Substantial economy can be realized by the use of simplified power supplies. In addition to the obvious economic advantage, simplification of the B+ power supply can result in reduction of the total power consumed by the receiver with an attendant decrease in the heat generated, and a desirable improvement in reliability.

It would be highly desirable to construct television receivers so that the few circuits requiring relatively high B+ voltage may be operated from the so-called boost voltage derived from the line scanning system, while the major portion of the receiver circuits which require only a lower voltage might be operated from the normally low B+ voltage which can be obtained from half-wave rectification of the standard A.C. line supply voltage.

Accordingly, it is an object of the present invention to provide an improved field scanning system for a television receiver which utilizes the available power sources in a highly efficient manner.

It is a further object to provide an improved television receiver field scanning system in which the sawtooth voltage wave generating means is energized by the so-called boost "B" supply voltage source.

It is a further object of the invention to provide an improved television receiver field scannnig system which largely avoids or eliminates the effects on vertical linearity of variations in boost voltage which normally accompany changes in image brightness.

It is an additional object of the invention to provide a high efficiency cathode ray vertical deflection system adapted to utilize power from a "B" boost voltage source, the output voltage of which is subject to variations in response to changes in picture brightness.

It is a different object of the invention to provide an inexpensive and more reliable television receiver apparatus.

Briefly, in accordance with the present invention, there is provided a field scanning circuit in which the sawtooth waveform generator circuit is energized by the so-called boost voltage derived from the efficiency diode of the line scanning system. Bias potential for the output amplifier of the field scanning system is derived from the grid leak bias network of the saw-tooth waveform generator stage. Compensating circuit means is coupled to the biasing circuit of the output amplifier and is provided with a control signal derived from the brightness control circuit of the cathode ray tube. The compensating circuit means operates to counteract changes in bias potential which would otherwise result from changes in the boost voltage caused by variations in the cathode ray beam current or picture brightness.

In present day commercial television apparatus the horizontal deflection circuit is normally utilized to supply second anode or ultor voltage to the cathode ray tube. For high efficiency and economy it is desirable to so construct the horizontal scanning system that the boost "B" voltage derivable therefrom will vary appreciably with changes in the cathode ray beam current. Such changes in the boost voltage caused by adjustment of the picture brightness makes it somewhat awkward to utilize the boost "B" voltage for powering other circuits of the reeciver. The present invention provides means to counteract such changes, thereby making it possible to utilize the boost voltage for driving the sawtooth generator of the field scanning system.

The present invention, both as to its organization and method of operations, together with further objects and advantages thereof, will best be understood by reference to the following specification taken in connection with the accompanying drawing, in which:

The sole figure of the drawing is a schematic diagram partly in block diagram form of a television receiver embodying features of the present invention.

Referring now to the drawing, the system therein illustrated comprises a television receiver of the superheterodyne type including an antenna system 12 which is connected to an RF amplifier, a mixer, an intermediate frequency amplifier, a video detector, and a video amplifier, all shown in block 10 and which will be recognizable to those skilled in the communications art as being exemplary components of one form of television receiver system. The television signal is intercepted by antenna 12, and after being translated through the receiver components represented in block 10, produces a video signal suitable for application to an image reproducing device.

The composite video signal is separated by the video amplifier into two components, the first component being a picture signal which is applied to the cathode ray tube 14 at input electrodes 16 and 18. The remaining portion of the video signal is applied to a sync separator circuit 20 which extracts synchronizing information for the vertical scanning and line scanning systems. The horizontal synchronizing information is applied from sync separator 20 to control the horizontal deflection circuitry represented by block 22. The field synchronizing information is applied from sync separator 20 to the field scanning system to be hereinafter described.

The line scanning system, as designated by block 22, is per se a part of the prior art and need not be described in detail herein except to say that it provides energizing potential to the ultor electrode or accelerating anode of the picture reproducer 14 by way of conductor 23, and further provides a source of so-called "boost" voltage at conductor 24, which boost voltage may be utilized for energizing other circuits of the receiver as described. A characteristic of such line scanning systems, which is particularly significant to the present invention, is the fact that the boost voltage derived from such systems depends on the Q of the horizontal deflection autotransformer and its associated circuits, and hence the boost voltage may vary inversely with changes in the average current drawn by the cathode ray tube from the high tension source.

As shown in the figure of the drawing, the line scanning system 22 produces linear deflection current waves which are applied to the horizontal deflection yoke 28 of the image reproducer. Vertical deflection or field scanning of the cathode ray tube is accomplished by the application of deflection current waves having substantially linear wave portions to the field scanning coils 58. Such field deflection current waves are supplied to the coils 58 from the vertical output transformer 52.

The field scanning system of the present invention comprises a saw-tooth voltage waveform generating means including a periodically charged capacitor 30 connected serially with a capacitor discharge current limiting resistor 32 with the series combination being connected between a point of reference potential or ground and the anode 36 of a first electron discharge device 34. The discharge device 34 has its cathode 40 connected serially with a resistor 90 to ground and is operative as a periodic switching means to periodically discharge the capacitor 30 through a low impedance path. Circuit means for charging the capacitor 30 is connected between the upper electrode of the capacitor 30 and the conductor 24, which conductor supplies boost voltage from the boost voltage source of the line scanning system. The capacitor charging circuit includes a series charging resistor 60 and an adjustable resistor 62 connected serially therewith. Resistor 62 is adjustable to vary the time constant of the charging path for capacitor 30 to determine the peak voltage to which the capacitor 30 may be charged during the vertical sweep interval. Resistor 62 therefore functions as and may be designated the "vertical height control."

For power amplification of the linear saw-tooth waves generated across capacitor 30, there is provided an output repeater electron discharge device 44 having a cathode 50 connected directly to ground, a grid 48 connected through a coupling capacitor 74 to the anode of tube 34, an anode electrode 46 connected to one end of the primary winding 54 of output transformer 52, and a screen grid electrode 47 which is connected to an intermediate terminal of the primary winding 54. The lower end terminal of the primary winding 54 is connected directly to a source of positive potential B+. The source of positive potential B+ is conventional and therefore need not be described in detail except to say that for purposes of economy it preferably comprises a simple half-wave rectifier circuit which is energized from the usual AC line voltage source. The saw-tooth voltage waveform developed by capacitor 30 and switching device 34 is impressed on the control electrode 48 of device 44 through the coupling capacitor 74. The vertical synchronizing information from sync separator 20 is also applied to control electrode 48 through capacitor 74, and determines with great accuracy the relative time of occurrence of the saw-tooth current applied by discharge device 44 to transformer 52.

A direct current bias potential is applied to control electrode 48 through resistor 76 from a biasing network including resistors 80, 78, 68 and 64 serially connected between a grid leak capacitor 66 and ground. The resistor 78 preferably is a variable resistance or potentiometer having its variable tap connected to the lower end of resistor 76 so that the voltage applied to control grid 48 may be manually varied to adjust the operating point of the discharge device 44. Adjustment of the operating point of the discharge device 44 with reference to its transconductance characteristic determines the linearity of the current waveform applied to transformer 52. Thus, it is clear that substantial variation in the bias potential supplied from the linearity control resistor 78 may result in undesirable non-linearity of the vertical sweep current as applied to yoke winding 58 from transformer 52.

The bias voltage appearing across resistors 78 and 80 is derived from the grid leak network which provides self-bias for the first discharge device 34. The self-biasing network includes a coupling capacitor 70, a grid leak capacitor 66 and a grid leak resistor 64 connected in series between the anode 46 of the second discharge device and the control electrode 38 of the first discharge device. A resistor 72 is connected between ground and the junction point of capacitors 66 and 70. The foregoing grid leak network is operative to apply periodic pulses from anode 46 to control electrode 38 of the first discharge device to drive the first discharge device into conduction, thereby abruptly terminating the saw-tooth waveform across capacitor 30 and quickly discharging the capacitor 30. The positive voltage pulses thus applied to control electrode 38 are of sufficient amplitude to drive the electrode 38 positive with respect to the cathode 40 so that the control electrode 38 draws grid current to develop a grid leak bias potential across capacitor 66. The grid leak bias potential also appears serially across resistors 68, 78 and 80. Thus, it is seen that the grid leak network comprises means for applying periodic conductance initiating signals to the control electrode of the switching discharge device 34 and also comprises means for deriving a grid leak biasing potential corresponding to the average amplitude of the signals applied from the repeater device 44 to the control electrode 38 of the switching discharge device 34.

The cathode ray tube 14 has its cathode electrode 16 connected over an isolating resistor 86 to a potentiometer type resistor 84 which comprises control means for applying variable bias to the cathode ray tube for controlling the average magnitude of the cathode ray beam current. The brightness control potentiometer 84 has its end terminals connected respectively to the potential source B+ and to ground. The intermediate tap 85 is adjustable to derive a variable D.C. potential which is applied to the cathode 16 through resistor 86. The potential at variable tap 85 is also applied by way of a resistor 82 to the junction point between the serially connected resistors 80 and 78 and is applied by way of a resistor 88 to the cathode of the first discharge device 34. The resistors 82, 88 and 80 comprise a compensating means connected between the adjustable brightness control 84 and the grid leak network to modify the bias potential applied to the control electrode 48, with such modification being in a direction such as to counteract the effect of boost voltage variations caused by changes in the average beam current.

The operation of the system of the present invention is substantially as follows. Initially, the switching discharge device 34 is non-conducting, and a linearly increasing saw-tooth voltage is developed across capacitor 30 by current flow from the boost voltage source 24 serially through resistor 62, resistor 60, the capacitor 30 and the resistor 32. The slope of the saw-tooth wave is determined by the RC constant of those circuit elements. The time duration of each saw-tooth wave is determined by the signal from sync separator 20, and therefore, adjustment of the waveform height may be accomplished by means of the variable resistor 62. The saw-tooth waveform at capacitor 30 is applied through coupling capacitor 74 to the control electrode 48 of the repeater discharge device 44 and causes the anode current through device 44 to increase linearly during a predetermined interval. At the end of the vertical sweep interval a pulse is applied from sync separator 20, through capacitor 74, to control electrode 48, to cut-off discharge device 44. The sharp decrease in anode current through primary winding 54 causes a sharp positive pulse to be applied through capacitor 70 and capacitor 66 to the control electrode 38 of the switching device 34, thereby causing device 34 to conduct to discharge the capacitor 30. The sudden decrease in potential at anode 36 regeneratively drives the control electrode 48 of the repeater discharge device 44 more negative so that the device 44 is rapidly driven below cut off and device 34 quickly becomes highly conductive.

From the foregoing it is readily seen that the maximum amplitude of the saw-tooth waveform voltage at capacitor 30 is dependent upon the voltage available from the boost voltage source by way of conductor 24. When the brightness control 84 is adjusted toward ground, cathode 16 of the cathode ray tube becomes more negative with respect to the control grid 18, thereby causing the average cathode ray beam current to increase so as to provide a television image of greater average brightness. The increase in cathode ray beam current results in greater loading of the high tension generator portion of the line scanning system 22. Such loading results in a decrease of the boost voltage available at conductor 24, which decrease is related to and dependent upon the change in the cathode ray biasing potential at tap 85 of the brightness control. The decrease in the boost voltage, as applied over conductor 24 and resistors 62 and 60, causes a decrease in the peak-to-peak amplitude of the saw-tooth voltage waveform. The decreased saw-tooth voltage amplitude results in a decrease in the pulse amplitude applied over capacitors 70 and 66 to the control electrode 38 of the first discharge device 34. Such decrease in the amplitude of the positive pulses at control electrode 38 causes a substantial decrease in grid current and a corresponding decrease in the grid leak bias potential developed across capacitor 66. The decreased bias potential results in a smaller leakage current through resistors 78 and 80 to ground.

Such decrease in leakage current is counteracted or compensated by the action of the compensating network including resistors 82, 80 and 88. The change in brightness control setting, which ultimately caused the foregoing change in grid leak bias, also provides a decrease in the positive voltage applied from tap 85 of the brightness control to resistors 82 and 88. The decrease in positive potential at the right end of resistor 82 causes a decrease in current through resistor 80 to ground, thus offsetting or counteracting the change in voltage at the linearity control 78 which would otherwise be caused by the change in grid leak biasing potential. As a final result, the biasing potential applied to the lower end of resistor 76 is maintained substantially constant and independent of changes in cathode ray beam current which are caused by change of the brightness control setting.

In summary, it is seen that the field scanning deflection circuit of the present invention constitutes an inexpensive and efficient arrangement whereby a so-called boost voltage source, the output voltage of which is subject to variations in response to variations in the brightness of the cathode ray tube display, may be used for energizing a saw-tooth waveform generating circuit for deflection of the cathode ray beam. By virtue of the compensating means coupled between the brightness control circuit and the vertical output stage biasing circuit, the bias potential applied to the vertical output stage is maintained substantially constant so that the output discharge device is continuously operated at a predetermined operating point with respect to its transfer characteristic. By maintaining a predetermined operating point, linearity of the output current waveform is assured regardless of changes in the amplitude of the saw-tooth waveform applied to the output stage.

While there has been shown and described what at present is considered to be the preferred embodiment of the present invention, it will be obvious to those skilled in the art that the invention is not so limited, but is susceptible of various changes and modifications without departing from the spirit and scope thereof.

I claim as my invention:

1. In a cathode ray tube deflection circuit, an output repeater discharge device having at least cathode, anode and control grid electrodes for producing deflection current waves each having a substantially linear wave portion, means including a periodically charged capacitor coupled to said control grid for impressing control voltage waves having linear portions on said discharge device, a voltage source for charging said capacitor, the output of said voltage source being subject to variations in response to variations in the brightness of the cathode ray tube display, brightness control means for applying variable bias to said cathode ray tube to determine the average brightness of said display, bias circuit means connected to apply bias potential between the grid and cathode electrodes of said discharge device with the magnitude of said bias being variable as a function of said deflection current waves, and compensation means coupled between said brightness control means and said bias circuit means to modify said bias potential in accordance with variations in the bias applied to said cathode ray tube.

2. In a television receiver including a cathode ray tube and a voltage source of the boost type with the output voltage thereof being responsive to variations in the cathode ray beam current; control means connected to apply variable bias to said cathode ray tube for adjusting the average magnitude of the cathode ray beam current; deflection circuit means for producing deflection current waves each having a substantially linear portion, said circuit means including an electron discharge device having at least a control grid, an anode and a cathode, wave generator means coupled to the grid circuit of said device for impressing voltage waves having linear wave portions thereon, means for supplying energizing voltage to said wave generator means from said boost type voltage source, whereby the deflection voltage waves are variable in amplitude in response to variations in the output voltage of said source, means to supply bias potential to said discharge device in proportion to the amplitude of said deflection voltage waves, and compensation means coupled to said cathode ray tube control means for supplying a supplementary bias potential to said discharge device with the magnitude of said supplementary bias being dependent on the magnitude of said cathode ray beam current.

3. In a television receiver of the type in which cathode ray tube ultor voltage is derived from the line scanning system and in which the line scanning system includes a source of boost voltage, the output voltage of which is subject to variations in response to variations in the cathode ray beam current, a vertical deflection system comprising saw-tooth voltage generating means including a storage capacitor, a self-biased electron discharge device having a cathode, anode and a control electrode with the anode-cathode circuit of said device being connected to periodically discharge said capacitor through a low impedance path; circuit means for supplying charging current to said capacitor from said source of boost voltage; a second electron discharge device having cathode, anode and control electrodes, the input circuit of said second discharge device being coupled to said saw-tooth voltage generating means; a grid leak network coupled between the output circuit of said second discharge device and the control electrode of said first discharge device for applying periodic conductance initiating signals to said control electrode with the amplitude of said signals being dependent upon the amplitude of said saw-tooth voltage and for deriving a grid leak biasing potential corresponding to the average amplitude of said signals, control means connected to apply variable bias to the cathode ray tube for controlling the average magnitude of the cathode ray beam current, and biasing means connected to the input circuit of said second discharge device, said biasing means including means for deriving from said grid leak network a first potential which varies as a function of said boost voltage, means for deriving from said cathode ray control means a second potential corresponding to the variable bias applied to the cathode ray tube, and means connected between said network and said biasing means for combining said first and second potentials to produce a biasing potential for application to said second discharge device, said last-mentioned potential being substantially independent of variations in boost voltage caused by adjustment of the cathode ray display brightness.

4. In a television receiver in which the line scanning system provides ultor voltage for the cathode ray tube and a source of boost voltage for driving other circuits, a vertical deflection system comprising first and second electron valve devices each having a cathode, an anode and a control electrode, saw-tooth voltage generating means including a storage capacitor connected between the anode and cathode of said first device, means for supplying charging current to said capacitor from said source of boost voltage, means connected between said capacitor and the control electrode of said second device for applying saw-tooth voltage waves thereto, circuit means coupled between the output circuit of said second device and the control electrode of said first device for applying positive voltage pulses thereto to initiate periodic conduction in said first device, said circuit means including a grid leak capacitor connected so as to develop and apply a self-bias potential to said first device with the magnitude of said self-bias potential corresponding to the amplitude of said positive voltage pulses, a voltage divider network connected to said circuit means and to the control electrode of said second device for applying a portion of said self-bias potential between the cathode and control electrode of said second device, adjustable control means connected to the input circuit of the cathode ray tube to apply a variable bias potential thereto for controlling the average cathode ray beam current and picture brightness, and compensating means connected between said adjustable control means and one of said discharge devices so as to modify the bias potential applied thereto in a manner counteracting the effect of boost voltage variations caused by changes in average beam current.

References Cited in the file of this patent

UNITED STATES PATENTS

| | | |
|---|---|---|
| 2,644,105 | Fyler | June 30, 1953 |
| 2,795,733 | Wilkomerson | June 11, 1957 |
| 2,836,762 | Ruby et al. | May 27, 1958 |
| 2,841,744 | Chass | July 1, 1958 |